Patented Feb. 13, 1940

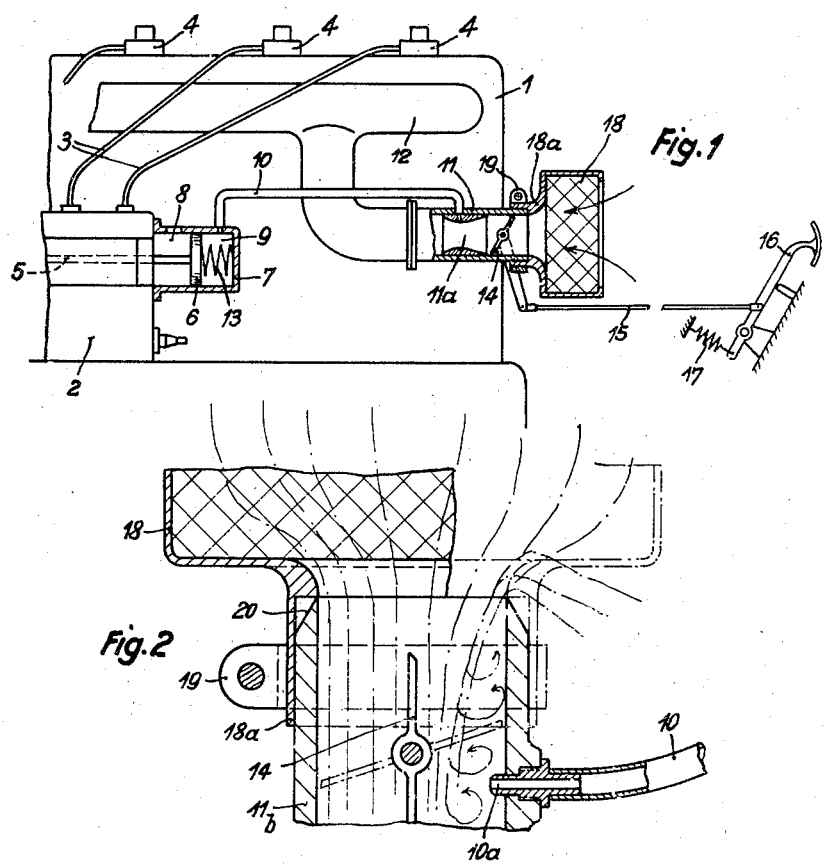

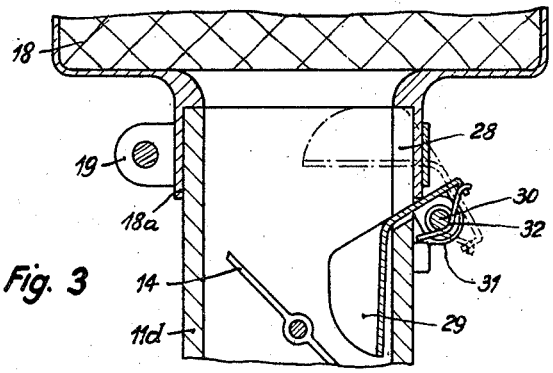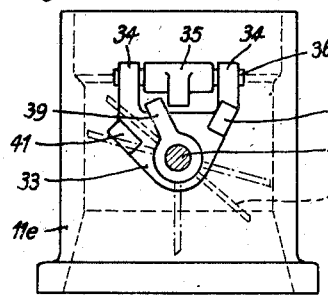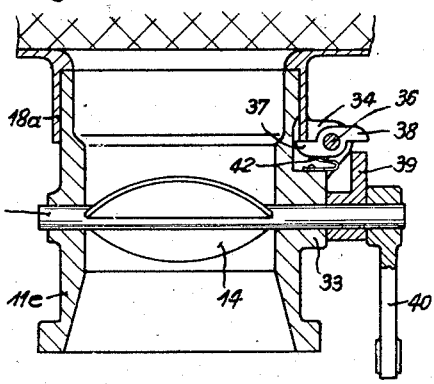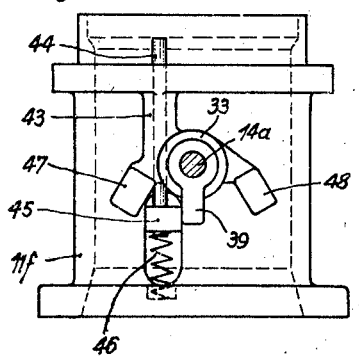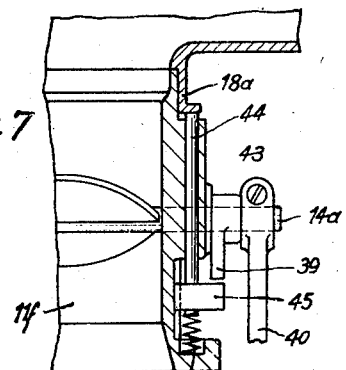

2,190,630

UNITED STATES PATENT OFFICE 2,190,630

OUTPUT CONTROL FOR INTERNAL COMBUSTION ENGINES

Johannes Weber, Stuttgart-Feuerbach, and Hermann Stoll and Max Hurst, Stuttgart, Germany, assignors to Robert Bosch Gesellschaft mit beschränkter Haftung, Stuttgart, Germany Application January 8, 1938, Serial No. 184,058
In Germany January 11, 1937

7 Claims. (Cl. 123—140)

The invention relates to an output control for internal combustion engines which include a filter for the air sucked into the engine and in which the amount of fuel reaching the cylinders of the engine may be influenced by the adjustment of a throttle member provided in the air feed pipe of the engine.

With internal combustion engines of this type it is desirable that the air sucked in by the cylinder first passes through an air filter so that impurities carried along by the air are taken out and cannot reach the cylinder. However, the impurities, which collect in the air filter, increase the air-resistance which the suction filter opposes to the air passing through, so that, for instance in engines using a mixture of a vaporisable spirit and air, a decrease in the output of the internal combustion engine will occur. Now by taking off the air filter, the driver could bring about an increase in the number of revolutions when the engine is operating with a completely opened throttle valve, which increase might even rise beyond the predetermined maximum number of revolutions occurring during operation even with a clean air filter. By removing the air filter, however, the machine would be exposed to the risk of impurities penetrating into the cylinders. Should internal combustion engines, such as, for instance, injection internal combustion engines, be run without the air filter, and thus the normal revolutions be exceeded with an increase in normal load output, an inadmissible heating up of the engine would also occur owing to this increase and might lead to damage to the engine.

To avoid this possibility, according to this invention, means are provided which, when the air filter is taken off, provide a resistance to flow in the air feed pipe of the internal combustion engine, which resistance is substantially equal to the resistance to flow when the air filter is in position. The use of these means is of especial importance with injection internal combustion engines in which the amount of fuel to be injected is regulated by a pneumatic governor which adjusts itself according to conditions prevailing in the air feed pipe of the machine.

The invention is more particularly described with reference to the accompanying drawings, in which:

Fig. 1 shows a partial section of an injection internal combustion engine and injection pump and a partial section through the governor and the suction pipe together with the air filter according to the first example of construction.

Fig. 2 shows another way of construction in an enlarged section through the end of the suction pipe and of the filter.

Fig. 3 shows these parts in a third example of construction.

Fig. 4 shows a side elevation of another example of construction.

Fig. 5 shows a longitudinal section through this example.

Fig. 6 is a side elevation of the parts according to another form of construction and Fig. 7 shows a longitudinal section of this example.

The outlets of an injection pump 2 driven by the internal combustion engine 1 are connected by means of pipes 3 with the injection nozzles 4 of the engine. A regulating rod 5, which is displaceable in the casing of the injection pump, varies simultaneously in known manner the delivery amount of the separate pumps. The regulating rod of the injection pump is connected with the piston 6 of a pneumatic governor 7 which is secured to the casing of the injection pump. The cylindrical inner space of the governor is divided by the piston 6 into two chambers 8 and 9, of which the chamber 8 is connected with the atmosphere, while the chamber 9 is connected by a flexible pipe with a point 11a of the intake pipe 11 which is narrowed in the manner of a venturi and which latter is connected to the suction manifold 12. The chamber contains a spring 13 which controls the movement of the piston 6 and of the regulating rod 5. Between the air intake opening and the Venturi constriction 11a, there is mounted in the intake pipe a throttle valve 14 which is connected with the pedal 16 by the rod 15. A spring 17 tends to keep the pedal in the position shown, in which the throttle valve keeps the passage through the intake pipe approximately closed.

An air filter 18 carries a tubular neck piece 18a which is bored to an extent equivalent to the thickness of the wall of the free end of the intake pipe in the suction pipe. The bored neck piece of the filter is pushed over the free end of the intake pipe until the shoulder of the bore of the filter neck abuts against the end of the intake pipe. The point of transition between the opening of the filter neck and the inner space of the air filter, which space is filled with a filtering medium, is rounded off in such a way that there results a gradual extension of cross section from the suction pipe towards the interior of the air filter. Round about the slotted part of the filter pipe, which is pushed on to the suction pipe, is placed a pipe support 19 which holds the filter firmly to the suction pipe. The filling of the air filter is formed by a mass which opposes a very small resistance to the air passing through. The total air resistance of the filter is further reduced by an efficient guiding of the air at the rounded off transition into the suction pipe, so that the air resistance produced by the intake pipe of the suction pipe without the filter put on is larger than the air resistance occurring when the air filter is in place.

If the driver has taken off the air filter and the engine is in operation without it, there is formed at the edge which is now free, of the intake pipe, a contraction of the air sucked in of such magnitude that a higher depression occurs in the venturi and thus in the regulator chamber 9 than if the air filter were in position. If the driver then wishes to run the engine at full load by opening the throttle valve, then the higher degree of depression will displace the piston 6 and the regulating rod 5 to the right against the force of the return spring 13 by a larger amount than the amount by which the depression occurring in this case with the air filter in position, would adjust the regulating rod in that direction in which the regulating rod adjusts the injection pumps to a smaller delivery amount. Thus there is obtained a simple protection of the engine against a too large increase in the number of revolutions and against a too great heating, due to an inadmissibly high load with the air filter taken off. The temptation for the driver to take off the filter is thus done away with. The risk of fouling the cylinder by protracted operation of the machine without the air filter is thus also removed.

In the example shown in Fig. 2, the end of the intake pipe 11b of the injection manifold 12 is bevelled off by a conical annular surface 20 in such a manner that this surface forms a sharp annular rim with the inner wall of the intake. As shown in Fig. 2, (on the left hand side of which a part of the air filter placed in position is shown by cross-hatched lines) when the filter is put on, the shoulder of the bored filter neck impinges upon the sharp annular surface of the end of the intake pipe. The rounded part of the filter neck seated on the rim forms a smooth transition surface between the inner wall of the air filter and that of the intake pipe, so that the air current, shown in the left hand part of Fig. 2 by dotted lines, experiences no resistance worth mentioning on transition from the filter into the suction pipe.

As against this, with the air filter taken off, the conical annular surface 20 at the end of the intake pipe operates as a guide surface for a part of the air, sucked in by the intake opening, so that this air as shown by the current lines of the air commencing from the right at the bottom, impinges at the sharp edge on to the air flowing from above. By this means, with the air filter taken off, a sharp contraction of the air flowing in is brought about which contraction can cause a higher depression at the mouth of the connecting pipe 10a of the flexible tube 10 connected with the regulating chamber, which pipe 10a projects into the unnarrowed intake pipe, than can arise there by the smooth guiding of air with the air filter in position.

The example of construction in Fig. 3 differs from the examples described in that in the wall at the end of the suction pipe intake 11d there is provided a slot 28, in which a flap 29 is mounted and is secured externally of the pipe on a spindle 30. The spindle is mounted in bosses 31, which are secured to the body of the pipe. The part of the flap situated in the inner space of the intake of the pipe consists of a section of a tubular element of which the exterior diameter roughly corresponds to the interior diameter of the intake of the pipe. The section is of spoonshape, and, in the position shown, bears against the inner wall of the intake of the pipe, so that the inflow of air into the intake is not hindered. The neck 18a of the air filter 18, which neck is pushed over the opening of the intake, closes the slot 28, and tensioning a wire spring 32 wound round the spindle 30, pushes the flap 29 into the position shown, in which the flap bears against the inner wall of the intake. As soon as the filter is taken off, the spring rocks the flap into the position shown with dotted lines, in which it covers a part of the intake. The air drawn into the opening of the intake pipe on operation of the engine without the air filter is throttled by the flap, so that, independently of the position of the throttle valve 14, a higher depression occurs at the point of entry (not shown) of the flexible pipe 10 into the intake than on operation with the air filter put on.

In the example of construction in Figs. 4 and 5, a boss 33 is arranged at the side facing the air filter in which boss is mounted the shaft 14a of the throttle valve. This boss 33 carries bosses 34 in which is mounted a shaft 36 carrying a pawl 35. As shown by Figure 5, the pawl carries on both sides of the shaft mutually opposed nose pieces 37 and 38. On the shafts 14a of the throttle valve there is secured an arm 39 which, in the end positions of the throttle valve adjustable by means of the lever 40, abuts against two stops 41 seated on the bosses 34 (Fig. 4). If the air filter 18 is put on, then the rim of the filter neck 18a, tensioning a flat spring 42, presses the nose piece 37 of the pawl 35 downwards, whereby the nose piece 38 comes out of the range of the arm 39. If the filter is taken off, the spring 42 turns the nose piece 37 of the pawl upwards, and the nose piece 38 comes into the range of adjustment of the arm 39. If the driver now sets the engine into operation, he cannot adjust the throttle valve 14 into the full opening position, since the arm 39 abuts on the nose 38 of the pawl. The throttling of the air sucked in at least compensates the decrease in the air resistance in the intake pipe, which is possible owing to the removal of the air filter, so that, during operation without the air filter, an increase of the number of revolutions of the engine above the permissible extent cannot occur.

In the example in Figs. 6 and 7, a boss 43 running along the intake is connected with the boss provided at the intake pipe 11f forming a bearing for the throttle valve and in the bore of this boss 43 a pin 44 is guided. On the part of the pin remote from the opening side of the intake, which projects out of the boss 43, a stop 45 is secured. One end of a threaded spring 46 is supported on a casing flange of the intake, and the other end bears against the stop 45. The spring tends to displace the stop 45 and the pin 44 in a direction towards the filter and to keep the stop within the range of adjustment of an arm 39 secured on the shaft 14a of the throttle valve 14, which arm is adjustable between the bosses 47 and 48 seated on the intake. The range of adjustment of the arm corresponds to the angle of adjustment of the throttle valve. When the filter neck 18a is pushed over the free end of the intake pipe, the pin 44 projecting out of the boss 43 is pressed into the bore of the boss by the rim of the filter neck, whereby the spring 46 is compressed and the stop 45 is displaced out of the range of adjustment of the rim 39. As soon as the filter is taken off, the spring presses the pin upwards together with the stop so that the stop then comes into the range of adjustment of the rim 39. If the driver wishes to open the throttle valve, the stop prevents an adjustment of the valve into the full opening position.

We declare that what we claim is:

1. An output control for internal combustion engines including an air-inlet pipe, a throttle therein, an air filter mounted on said pipe, means to restrict air flow into said inlet pipe, and means automatically setting said means out of operation when the filter is mounted on said pipe.

2. An output control for internal combustion engines including an air inlet pipe, a throttle therein, an air filter mounted thereon, automatic means restricting air flow into said inlet pipe, a spring tending to hold said means in positon, and cooperating parts on said air filter and said automatic means whereby said automatic means are displaced against said spring to restore full free flow of air into the inlet pipe when the air filter is mounted on said inlet pipe.

3. An output control for internal combustion engines including an air inlet pipe, a throttle therein, an air filter mounted thereon, an air flow baffle in said inlet pipe, a spring displacing said baffle into a position to restrict air flow through said inlet pipe, and an abutment on said air filter adapted to displace said baffle into ineffective position against said spring when said filter is mounted in position on said inlet pipe.

4. An output control for internal combustion engines including an air inlet pipe, a throttle therein, an air filter mounted on said pipe, a flap valve, a spring tending to displace said flap valve into a position in said pipe to restrict air flow therethrough, and an abutment on said air filter adapted to displace said flap valve into ineffective position when said air filter is mounted on said pipe.

5. On output control for internal combustion engines, including an air inlet pipe, a throttle therein, an actuating element for said throttle, a stop, a spring displacing said stop into the path of said actuating element, and an abutment on said air filter adapted to displace said stop against the spring out of range of said actuating element.

6. An output control for internal combustion engines including an air inlet pipe, a throttle therein, an air filter removably mounted on said pipe, said air pipe being provided with means to so restrict the flow of air into said inlet pipe that said flow is less without the filter than with the filter in position on said pipe, and means carried by said filter for controlling the operation of said first-mentioned means.

7. On output control for internal combustion engines, including an air inlet pipe, a throttle therein, an air filter removably mounted in the free end of said air inlet pipe, a liquid fuel injection device, a pneumatic governor controlling the output of said liquid fuel device, a pipe operatively connecting said pneumatic governor with the interior of the air inlet pipe, and means whereby the pressure within said air inlet pipe is automatically increased when the air filter is in place and decreased when the filter is removed, said variations in pressure being transmitted through said connecting pipe to said pneumatic governor.

JOHANNES WEBER.
HERMANN STOLL.
MAX HURST.